United States Patent
Ghosh et al.

(10) Patent No.: US 11,489,661 B2
(45) Date of Patent: Nov. 1, 2022

(54) HIGH THROUGHPUT POST QUANTUM AES-GCM ENGINE FOR TLS PACKET ENCRYPTION AND DECRYPTION

(71) Applicant: Intel Corporation, Santa Clara, CA (US)

(72) Inventors: Santosh Ghosh, Hillsboro, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 121 days.

(21) Appl. No.: 16/909,648

(22) Filed: Jun. 23, 2020

(65) Prior Publication Data

US 2021/0399876 A1    Dec. 23, 2021

(51) Int. Cl.
*H04L 29/06* (2006.01)
*H04L 9/06* (2006.01)
(Continued)

(52) U.S. Cl.
CPC ........... *H04L 9/0631* (2013.01); *G06N 10/00* (2019.01); *H04L 9/0637* (2013.01);
(Continued)

(58) Field of Classification Search
CPC . H04L 9/0631; H04L 9/0637; H04L 2209/12; H04L 2209/125
See application file for complete search history.

(56) References Cited

U.S. PATENT DOCUMENTS

| 2008/0040604 A1* | 2/2008 | Kim ................. H04L 63/0428 713/168 |
| 2012/0011351 A1* | 1/2012 | Mundra ............. H04L 47/2441 713/1 |

(Continued)

FOREIGN PATENT DOCUMENTS

| CN | 113839770 A | 12/2021 |
| EP | 3930253 | 12/2021 |

OTHER PUBLICATIONS

Extended European Search Report EP Application No. 20205013.4, dated Apr. 12, 2021, 6 pages.

(Continued)

*Primary Examiner* — Dao Q Ho
(74) *Attorney, Agent, or Firm* — Jaffery Watson Mendonsa & Hamilton LLP

(57) ABSTRACT

An apparatus comprises an input register to receive a transport layer data packet, an encryption/decryption pipeline communicatively coupled to the input register, comprising a first section comprising a set of advanced encryption standard (AES) engines including at least a first AES engine to perform encryption and/or decryption operations on input data from the at least a portion of a transport layer data packet, a second AES engine to determine an authentication key, and a third AES engine to determine an authentication tag mask, a second section comprising a first set of Galois field multipliers comprising at least a first Galois field multiplier to compute a first multiple of the authentication key, a third section comprising a second set of (Continued)

Galois field multipliers to compute a first partial authentication tag, and a fourth section comprising a processing circuitry to compute a second partial authentication tag and a final authentication tag.

12 Claims, 7 Drawing Sheets

(51) Int. Cl.
    *G06N 10/00*     (2022.01)
    *H04L 9/08*     (2006.01)
    *H04L 9/40*     (2022.01)

(52) U.S. Cl.
    CPC ........ *H04L 9/0852* (2013.01); *H04L 63/0428* (2013.01); *H04L 63/166* (2013.01)

(56) References Cited

U.S. PATENT DOCUMENTS

| | | | |
|---|---|---|---|
| 2012/0170738 A1* | 7/2012 | Lablans | H04L 9/0625 380/28 |
| 2017/0288855 A1* | 10/2017 | Kumar | H04L 9/0662 |
| 2019/0132118 A1* | 5/2019 | Ghosh | H04L 9/321 |
| 2019/0229925 A1* | 7/2019 | Kounavis | H04L 9/0631 |

OTHER PUBLICATIONS

David A. McGrew, et al.,"The Galois/Counter Mode of Operation (GCM)" In: "Progress in cryptology—INDOCRYPT 2004; 5th International Conference on Cryptology in India, Chennai, India, Dec. 20-22, 2004, proceedings", Jan. 1, 2005, Berlin [u.a.]; Springer, DE, XP055537225, ISBN: 978-3-540-24130-3, vol. 3348, pp. 343-355.

Kevin Brstinghaus-Steinbach, et al., "Post-Quantum TLS on Embedded Systems", IACR, International Association for Cryptologic Research, vol. 20200312:151206, Mar. 11, 2020, pp. 1-12, XP061035433.

* cited by examiner

HIGH THROUGHPUT POST QUANTUM AES-GCM ENGINE FOR TLS PACKET ENCRYPTION AND DECRYPTION

BACKGROUND

Subject matter described herein relates generally to the field of computer security and more particularly to a high throughput post quantum advanced encrypt standard Galois/Counter mode (AES-GCM) engine for transport layer security (TLS) packet encryption and/or decryption.

In a cloud computing system, confidential information is stored and used by, and transmitted between, many different information processing systems. Cloud computing environments need both confidentiality and integrity/authentication to protect sensitive data during transport through network traffic. Transport Layer Security (TLS) is a known protocol used for protecting network traffic. Recently, TLS has been equipped with post-quantum security to make this protocol robust against attacks by quantum computers. In one example, BIKE (Bit Flipping Key Encapsulation) and SIKE (Supersingular Isogeny Key Encapsulation) algorithms are incorporated into TLS protocols for establishing a common secret key between client and server. The 256-bit secret key may then used for mass data communication encrypted by AES-GCM using AES-256. In public cloud environments, millions of clients may be connected simultaneously (e.g., through a Network Interface Card (NIC)), which requires high-throughput AES-GCM encryption/decryption with millions of different secret keys.

Accordingly, techniques to implement a high throughput post quantum advanced encrypt standard Galois/Counter mode (AES-GCM) engine for transport layer security (TLS) packet encryption and/or decryption may find utility, e.g., in computer-based communication systems and methods.

BRIEF DESCRIPTION OF THE DRAWINGS

The detailed description is described with reference to the accompanying figures.

DETAILED DESCRIPTION

Described herein are exemplary systems and methods to implement a high throughput post quantum advanced encrypt standard Galois/Counter mode (AES-GCM) engine for transport layer security (TLS) packet encryption and/or decryption. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

Example Cloud Computing Environment

Figure 1:
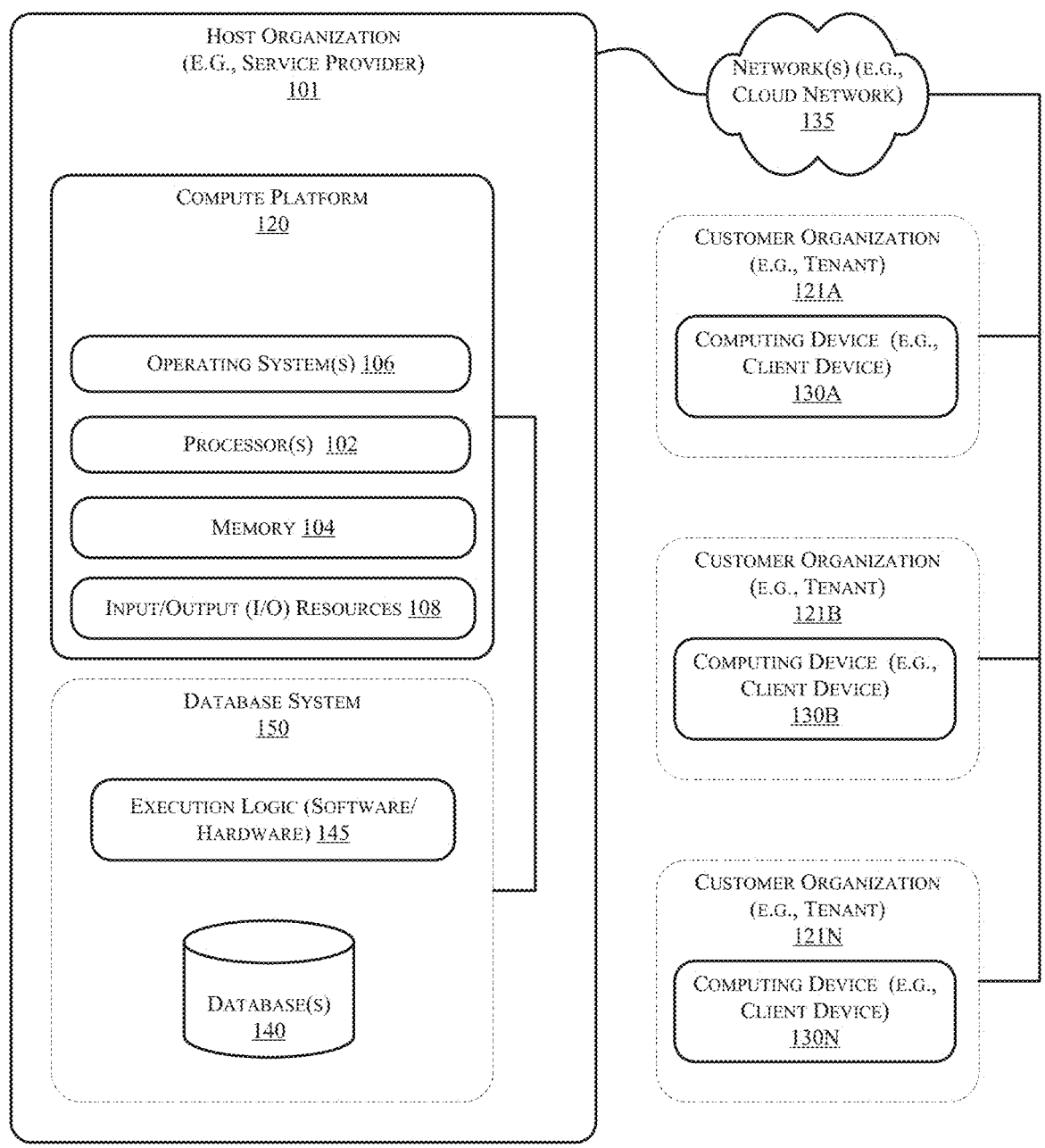
FIG. 1 is a schematic illustration of a processing environment in which systems and methods for a high throughput post quantum advanced encrypt standard Galois/Counter mode (AES-GCM) engine for transport layer security (TLS) packet encryption and/or decryption may be implemented, according to embodiments.

FIG. 1 is a schematic illustration of a processing environment in which systems and methods for a high throughput post quantum advanced encrypt standard Galois/Counter mode (AES-GCM) engine for transport layer security (TLS) packet encryption and/or decryption may be implemented, according to embodiments. Referring to FIG. 1, a system 100 may comprise a compute platform 120. In one embodiment, compute platform 120 includes one or more host computer servers for providing cloud computing services. Compute platform 120 may include (without limitation) server computers (e.g., cloud server computers, etc.), desktop computers, cluster-based computers, set-top boxes (e.g., Internet-based cable television set-top boxes, etc.), etc. Compute platform 120 includes an operating system ("OS") 106 serving as an interface between one or more hardware/physical resources of compute platform 120 and one or more client devices 130A-130N, etc. Compute platform 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile compute platforms, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database system 150 includes database(s) 140 to store (without limitation) information, relational tables, datasets, and underlying database records having tenant and user data therein on behalf of customer organizations 121A-N (e.g., tenants of database system 150 or their affiliated users). In alternative embodiments, a client-server computing architecture may be utilized in place of database system 150, or alternatively, a computing grid, or a pool of work servers, or some combination of hosted computing architectures may be utilized to carry out the computational workload and processing that is expected of host organization 101.

The illustrated database system 150 is shown to include one or more of underlying hardware, software, and logic elements 145 that implement, for example, database functionality and a code execution environment within host organization 101. In accordance with one embodiment, database system 150 further implements databases 140 to service database queries and other data interactions with the databases 140. In one embodiment, hardware, software, and logic elements 145 of database system 150 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N may include an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a server within host organization 101. Host organization 101 may receive a variety of requests for processing by host organization 101 and its database system 150. For example, incoming requests received at the server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the server or as a stand-alone interface to receive requests packets or other requests from the client devices 130A-N. The request interface may further support the return of response packets or other replies and responses in an outgoing direction from host organization 101 to one or more client devices 130A-N.

It is to be noted that terms like "node", "computing node", "server", "server device", "cloud computer", "cloud server", "cloud server computer", "machine", "host machine", "device", "compute platform", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
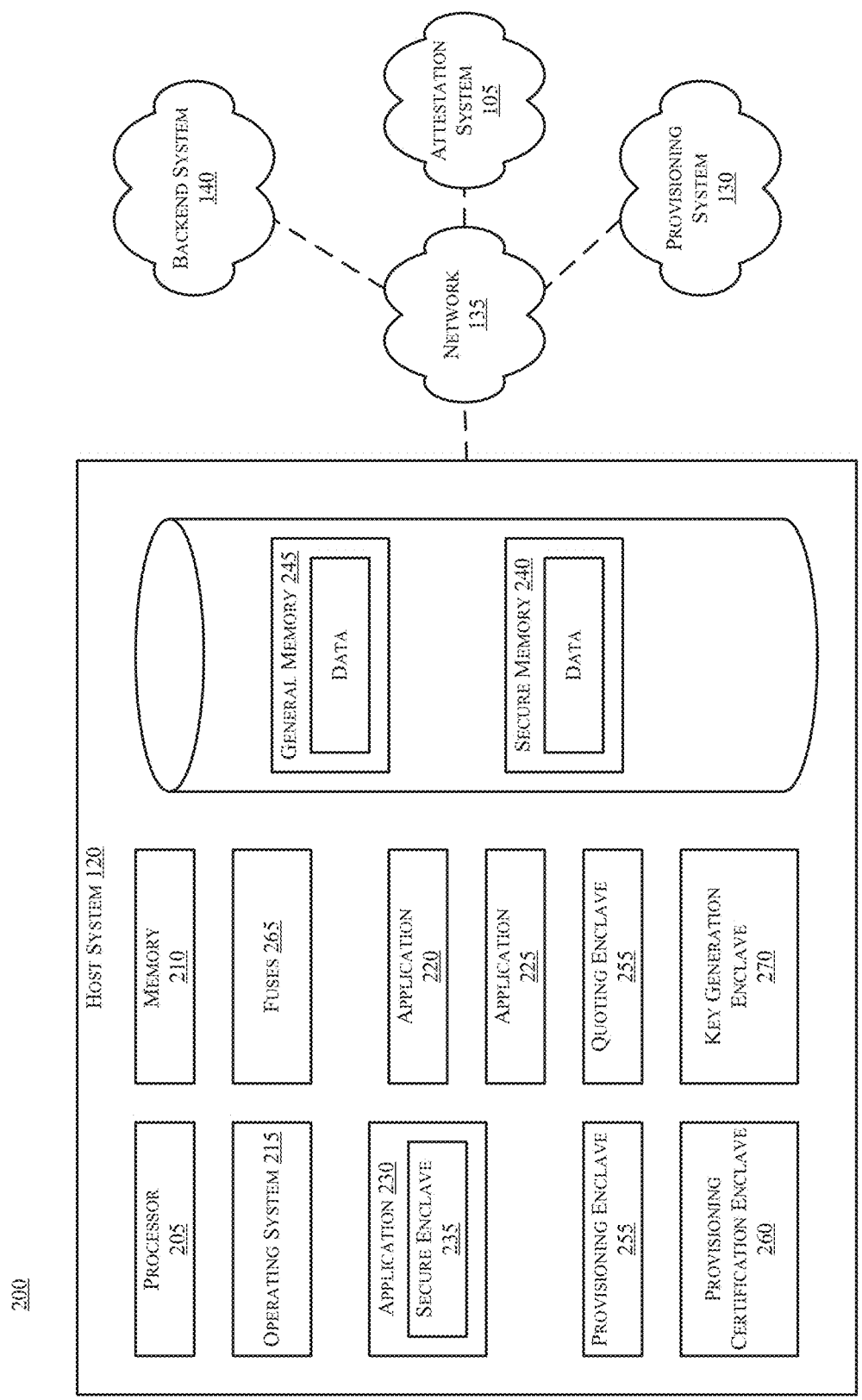
FIG. 2 is a simplified block diagram of an example system including an example platform supporting a high throughput post quantum advanced encrypt standard Galois/Counter mode (AES-GCM) engine for transport layer security (TLS) packet encryption and/or decryption in accordance with an embodiment.

FIG. 2 is a simplified block diagram of an example system including an example host system compute platform 120 supporting trusted execution aware hardware debug and manageability in accordance with an embodiment. Referring to the example of FIG. 2, a compute platform 120 can include one or more processor devices 205, one or more memory elements 210, and other components implemented in hardware and/or software, including an operating system 215 and a set of applications (e.g., 220, 225, 230. One or more of the applications may be implemented in a trusted execution environment secured using, for example, a secure enclave 235, or application enclave. Secure enclaves can be implemented using secure memory 240 (as opposed to general memory 245) and utilizing secured processing functionality of at least one of the processors (e.g., 205) of the compute platform 120 to implement private regions of code and data to provide secured or protected execution of the application. Logic, implemented in firmware and/or software of the compute platform (such as code of the CPU of the host), can be provided on the compute platform 120 that can be utilized by applications or other code local to the compute platform to set aside private regions of code and data, which are subject to guarantees of heightened security, to implement one or more secure enclaves on the system. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources. Secure enclaves can enable applications to define secure regions of code and data that maintain confidentiality even when an attacker has physical control of the platform and can conduct direct attacks on memory. Secure enclaves can further allow consumers of the host devices (e.g., compute platform 120) to retain control of their platforms including the freedom to install and uninstall applications and services as they choose. Secure enclaves can also enable compute platform 200 to take measurements of an application's trusted code and produce a signed attestation, rooted in the processor, that includes this measurement and other certification that the code has been correctly initialized in a trustable execution environment (and is capable of providing the security features of a secure enclave, such as outlined in the examples above).

Figure 3:
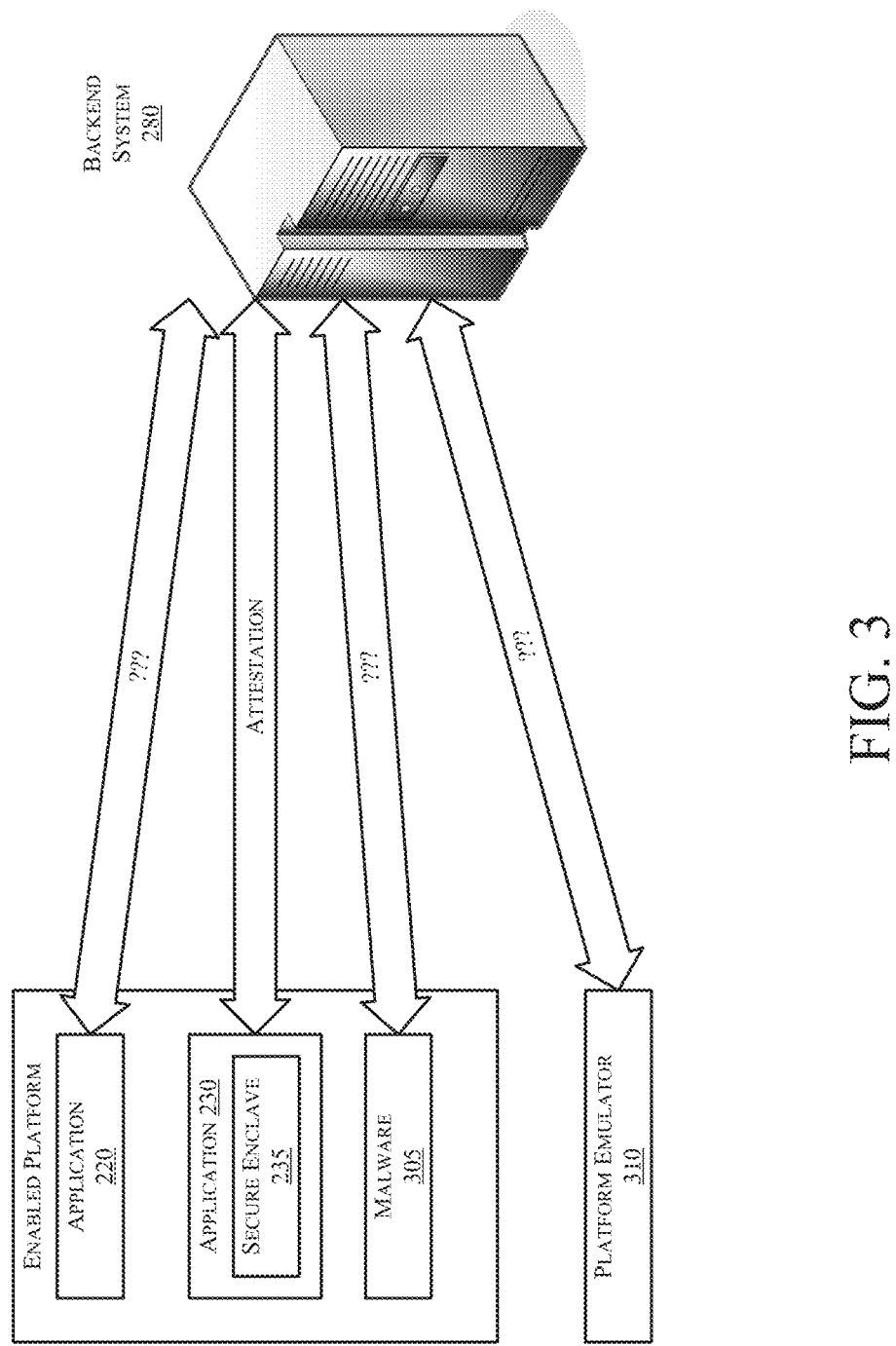
FIG. 3 is a simplified block diagram of at least one embodiment of a computing system which may be adapted to implement a high throughput post quantum advanced encrypt standard Galois/Counter mode (AES-GCM) engine for transport layer security (TLS) packet encryption and/or decryption according to an embodiment.

Turning briefly to FIG. 3, an application enclave (e.g., 235) can protect all or a portion of a given application 230 and allow for attestation of the application 230 and its security features. For instance, a service provider in backend system 280, such as a backend service or web service, may prefer or require that clients with which it interfaces, possess certain security features or guarantees, such that the backend system 280 can verify that it is transacting with who it the client says it is. For instance, malware (e.g., 305) can sometimes be constructed to spoof the identity of a user or an application in an attempt to extract sensitive data from, infect, or otherwise behave maliciously in a transaction with the backend system 280. Signed attestation (or simply "attestation") can allow an application (e.g., 230) to verify that it is a legitimate instance of the application (i.e., and not malware). Other applications (e.g., 220) that are not equipped with a secure application enclave may be legitimate, but may not attest to the backend system 280, leaving the service provider in doubt, to some degree, of the application's authenticity and trustworthiness. Further, compute platform platforms (e.g., 200) can be emulated (e.g., by emulator 310) to attempt to transact falsely with the backend system 280. Attestation through a secure enclave can guard against such insecure, malicious, and faulty transactions.

Returning to FIG. 2, attestation can be provided on the basis of a signed piece of data, or "quote," that is signed using an attestation key securely provisioned on the platform. Additional secured enclaves can be provided (i.e., separate from the secure application enclave 235) to measure or assess the application and its enclave 235, sign the measurement (included in the quote), and assist in the provisioning of one or more of the enclaves with keys for use in signing the quote and established secured communication channels between enclaves or between an enclave and an outside service (e.g., backend system 280, attestation system 105, provisioning system 130, backend system 140). For instance, one or more provisioning enclaves 255 can be provided to interface with a corresponding provisioning system to obtain attestation keys for use by a quoting enclave 255 and/or application enclave. One or more quoting enclaves 255 can be provided to reliably measure or assess an application 230 and/or the corresponding application enclave 235 and sign the measurement with the attestation key obtained through the corresponding provisioning enclave 250. A provisioning certification enclave 260 may also be provided to authenticate a provisioning enclave (e.g., 250) to its corresponding provisioning system (e.g., 120).

The provisioning certification enclave 260 can maintain a provisioning attestation key that is based on a persistently maintained, secure secret on the host platform 200, such as a secret set in fuses 265 of the platform during manufacturing, to support attestation of the trustworthiness of the provisioning enclave 250 to the provisioning system 290, such that the provisioning enclave 250 is authenticated prior to the provisioning system 290 entrusting the provisioning enclave 250 with an attestation key. In some implementations, the provisioning certification enclave 260 can attest to authenticity and security of any one of potentially multiple provisioning enclaves 250 provided on the platform 200. For instance, multiple different provisioning enclaves 250 can be provided, each interfacing with its own respective provisioning system, providing its own respective attestation keys to one of potentially multiple quoting enclaves (e.g., 255) provided on the platform. For instance, different application enclaves can utilize different quoting enclaves during attestation of the corresponding application, and each quoting enclave can utilize a different attestation key to support the attestation, e,g., via an attestation system 105. Further, through the use of multiple provisioning enclaves 250 and provisioning services provided, e.g., by one or more provisioning systems 130, different key types and encryption technologies can be used in connection with the attestation of different applications and services (e.g., hosted by backend systems 280).

In some implementations, rather than obtaining an attestation key from a remote service (e.g., provisioning system 120), one or more applications and quoting enclaves can utilize keys generated by a key generation enclave 270 provided on the platform. To attest to the reliability of the key provided by the key generation enclave, the provisioning certification enclave can sign the key (e.g., the public key of a key pair generated randomly by the key generation enclave) such that quotes signed by the key can be identified as legitimately signed quotes. In some cases, key generation enclaves (e.g., 270) and provisioning enclaves (e.g., 250) can be provided on the same platform, while in other instances, key generation enclaves (e.g., 270) and provisioning enclaves (e.g., 250) can be provided as alternatives for the other (e.g., with only a key generation enclave or provisioning enclaves be provided on a given platform), among other examples and implementations.

High Throughput Post-Quantum AES-GCM Engine

As described above, cloud computing environments need both confidentiality and integrity/authentication to protect sensitive data during transport through network traffic. Transport Layer Security (TLS) is a known protocol used for protecting network traffic. Recently, TLS has been equipped with post-quantum security to make this protocol robust against attacks by quantum computers. In one example, BIKE (Bit Flipping Key Encapsulation) and SIKE (Super-singular Isogeny Key Encapsulation) algorithms are incorporated into TLS protocols for establishing a common secret key between client and server. The 256-bit secret key may then used for mass data communication encrypted by AES-GCM using AES-256. In public cloud environments, millions of clients may be connected simultaneously (e.g., through a Network Interface Card (NIC)), which requires high-throughput AES-GCM encryption/decryption with millions of different secret keys.

To address these and other issues, described herein are examples of an inline encryption and authentication tag generation approach for high-throughput TLS packet processing which may service simultaneous connections in real time. In some examples, an AES-GCM pipeline engine may be constructed pursuant to the following principles to address key challenges. To provide frequent (i.e., every clock cycle) context switching among multiple simultaneous connections, an authentication key (h) for tag computation in the GCM is derived from the encryption key (k). Some existing systems compute h prior to encryption and tag generation through a handshake protocol between the host and the crypto engine, which adds a significant latency overhead for context switching. Systems described herein are capable to compute h on the fly for every input datablock that hides this latency with data encryption latency and provides ability of context switch in every clock. To accommodate variable TLS payload sizes on incoming TCP packets, the TCP packets within a connection may carry variable-sized TLS payload (e.g., 60-byte). Some existing solutions operate on static intermediate input block size (multiple of 16-byte AES block) incurring additional computation/latency overhead. Systems described herein are capable to, based on input block size (ranging from 1-byte to 64-byte), reconfigure the pipeline with automatic padding to perform encryption and partial tag computation.

Figure 4:
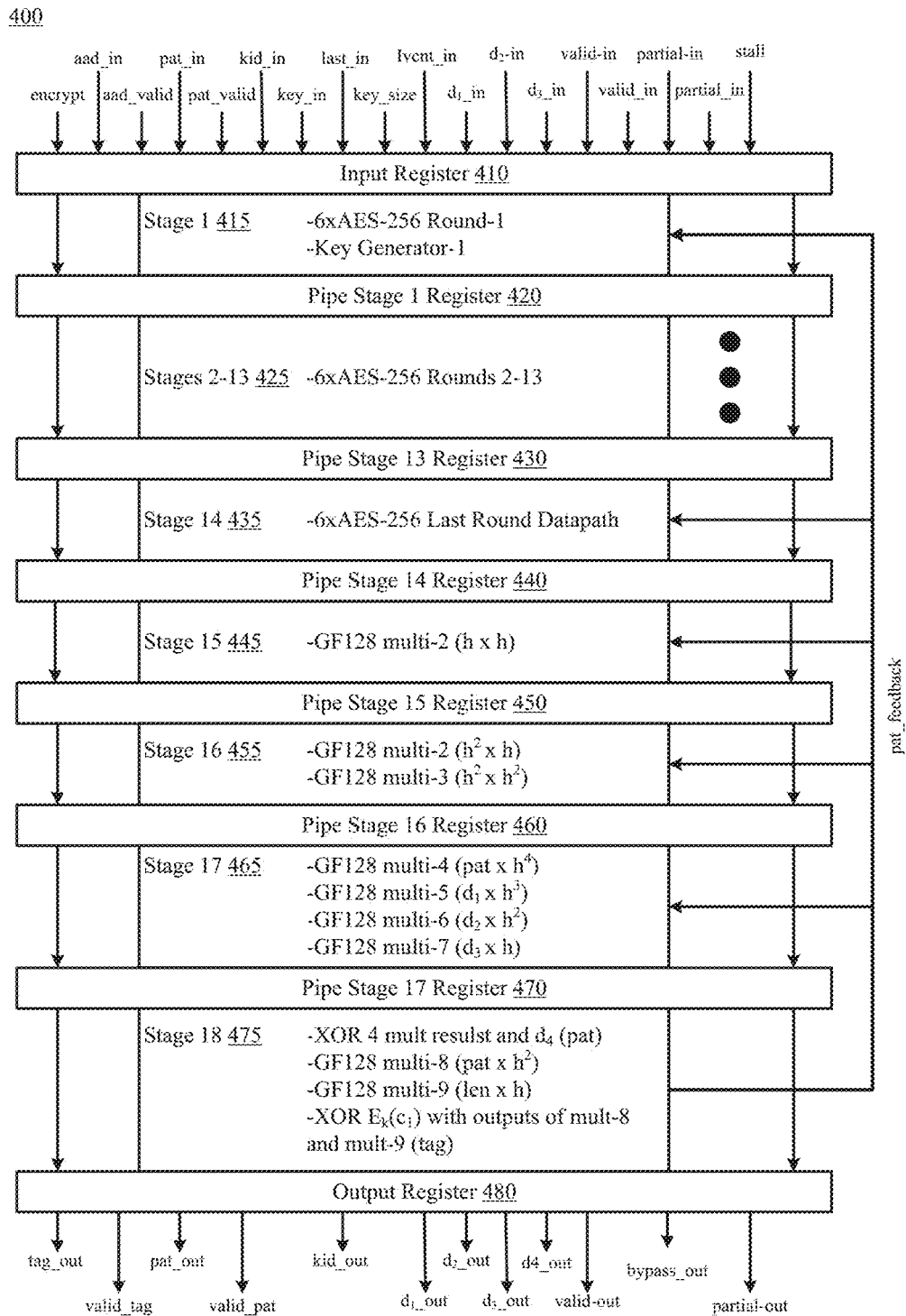
FIG. 4 is a schematic illustration of an architecture to implement a high throughput post quantum advanced encrypt standard Galois/Counter mode (AES-GCM) engine for transport layer security (TLS) packet encryption and/or decryption, in accordance with some examples.

FIG. 4 is a schematic illustration of an architecture to implement a high throughput post quantum advanced encrypt standard Galois/Counter mode (AES-GCM) engine for transport layer security (TLS) packet encryption and/or decryption, in accordance with some examples. Referring to FIG. 4, one example of an engine 400 comprises a pipelined architecture with eighteen (18) internal stages. More particularly, engine 400 comprises an input register 410 to receive a series of inputs. A key to the inputs is provided in Table 1.

TABLE 1

Inputs to Pipeline

```
parameter KEY-ID_SIZE = 8;
//************** IO Definitions *******************
input clk  ;
input resetn ;
input stall ;         // Pipeline will freeze -- does not move forward if stall = 1
input encrypt; // encrypt=1 for Encryption and encrypt=0 for Decryption
input last _in ; // Indicates that no more data to process so generate the Auth_Tag for kid_in.
input [127.0]      aad_in ; // AAD input.
input              aad_valid ;
input [127.0]      pad_in ; // PAD input for the switch back on a flow after more than 20 clocks within which
    pipeline is used for other flows.
input              pad_valid ;
input [3.0]        valid_in ; // Indicates the validity of data_in [3] for data_in1, ...., [0] for data-in4
input [KEY_ID_SIZE-1:0] kid_in ; // kid for the current key
input [255.0]          key_in ; // Secret key, use [255.128] for key_size 0
input              key_size ; // 0 means 128-bit of key_in[127.0], 1 mean 256-bit
input [127.0]      ivcnt_in ; // 96 bit IV [127.32] and 32 bit counter value [31.0] starts from 2 and increment by 1
    for each 128-bit block
input [127.0]      data_in1 ; // Plaintext-0 during encrypt and ciphertext during decrypt; within the 128-bit block
    we follow little endian
input [127.0]      data_in2 ; // Plaintext-1 during encrypt and ciphertext during decrypt
input [127.0]      data_in3 ; // Plaintext-2 during encrypt and ciphertext during decrypt
input [127.0]      data_in4 ; // Plaintext-3 during encrypt and ciphertext during decrypt; form 512-bit as:[data_in1,
    data_in2, data_in3, data_in4]
input              bypass_in ; //input data will be bypassed w/o Encrypt/Decrypt and w/o utilized it in Tag
    computation, set kid_in = 0 for bypass
input              partial_in; // a valid data block is partial
output logic       bypass_out;
output logic       partial_out;
output logic [3.0] valid_out ; // Indicates the validity of data_out in same order of data_in
output logic [127.0] data_out1 ; // Ciphertext-0 during encrypt and Plaintext during encrypt
output logic [127.0] data_out2 ; // Ciphertext-1 during encrypt and Plaintext during encrypt
output logic [127.0] data_out3 ; // Ciphertext-2 during encrypt and Plaintext during encrypt
output logic [127.0] data_out4 ; // Ciphertext-3 during encrypt and Plaintext during encrypt
output logic [KEY_ID_SIZE-1.0] kid_out ; // respective kid of the current outputs
output logic       valid_pad ; // indicates PAD is valid
output logic [127.0] pad_out ; // 128 bit Partial Authentication Data/Tag (PAD)
output logic       valid_tag ; // indicates Tag is valid
output logic [127.0] auth_out ; // 128 but Authentication Tag
```

Engine 400 further comprises intermediate pipeline stages 2-13 425 and final last-round stage 435. Each stage is communicatively coupled to a register to store output data. Thus, stage 1 415 is communicatively coupled to stage 1 register 420, stage 13 is communicatively coupled to stage 13 register 430, stage 14 435 is communicatively couple to stage 14 register 440, stage 15 445 is communicatively coupled to stage 15 register 450, stage 16 455 is communicatively coupled to stage 16 register 460, stage 17 465 is communicatively coupled to stage 17 register 470, and stage 18 475 is communicatively coupled to output register 480.

Pipeline stages 1 to 14 implement AES256 encryiption and/or decryiption in round-1 to round-14 respectively. The pipeline architecture has six (6) parallel AES256 round-1 to round-14 data paths, four (4) of which are used for up to 64-byte data encryption/decryption, one of which is used to compute authentication key (h) and another one is used for computing the authentication tag mask $E_k(c_1)$. The engine 400 receives up to 64-byte input data, a 16-byte Additional Authentication Data (AAD), a 32-byte encryption key, a 16-byte counter value and related control signals as inputs in every cycle and passes the inputs through pipeline with changing clock cycles. Pipeline stage 15 comprises one combinatorial GF(2128) multiplier that computes $h^2$ and places the outputs in register 450. Pipeline stage 16 comprises two combinatorial $GF(2^{128})$ multipliers that compute $h^3$ and $h^4$. Pipeline stage 17 comprises four combinatorial $GF(2^{128})$ multipliers to compute (pat×$h^4$, d1×$h^3$, d2×$h^2$, d3×h), where pat represents a partial authentication tag which is initialized to zero for a new TLS record and it holds the intermediate tag value up to the last data block processed by the AES-GCM engine, $d_1$, $d_2$, $d_3$ represent corresponding 16-byte data blocks from left to write within 64-byte data input.

Pipeline stage 18 accumulates all multiplication outputs of pipeline stage 17 and the right-most data block $d_4$ together to compute a new pat value: pat=(pat×$h_4$)^ ($d_1$×$h^3$)^($d_2$×$h^2$) ^($d_3$×h) ^$d_4$. This new pat value is further multiplied with $h^2$ to compute the final tag if the current block in 401 is indicated as the final/last data block of a TLS record. The new pat value and the key_id associated with it are feedback to all prior pipeline stages where it replaces the respective existing pat value if the feedback key_id matches with the respective key_id of each stage. Additionally, pipeline stage 18 comprises a $GF(2^{128})$ multiplier to perform multiplication between length of the entire TLS record and h. Then it computes the final accumulation of three things to generate the final tag=(pat×$h^2$)^(len×h)^$E_k(c_1)$, which is output from the pipeline only if stage 18 is processing the data with last=1. Otherwise, pipeline sets tag output to zero. As output from pipeline, it generates respective encrypted/decrypted 16-byte data, associated new pat value, the final tag with respective valid signals Engine 400 utilizes the following control mechanisms. It has a stall input which may be used to freeze the pipeline. In some examples, the AES-GCM pipeline does not advance if stall=1. The encrypt signal indicates the Encryption or Decryption mode of operations. The last_in input signal indicates that no more data to process so generate the final tag for this TLS record identified by the respective input kid. The engine 400 supports a 16-byte AAD, which is applied to the engine only once per connection with first valid data block. To accommodate large numbers of simultaneous connections/TLS-records the engine supports zero-delay context switch among connections. Each connection is associated with different key and key_id. Sometimes it is required to resume a connection which was idle for a while. To support that, the engine 400 generates the partially computed tag (or pat) which is stored by the driver/HW-wrapper along with the respective key_id. At resume, the driver provides the stored pat to the engine with new valid blocks.

Figure 5:
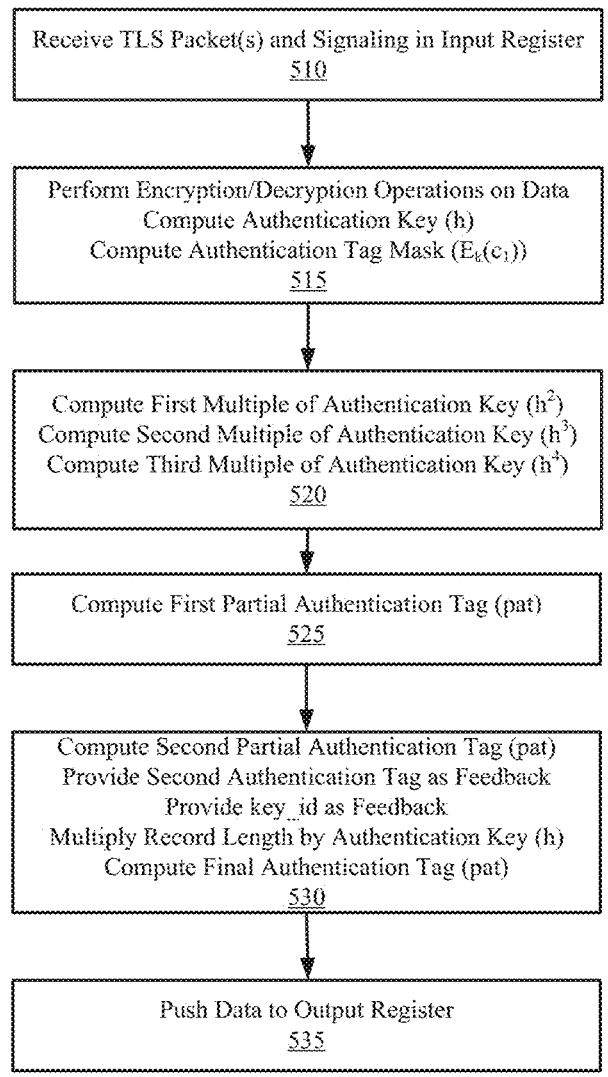
FIG. 5 is a flow diagram illustrating operations in a method to implement a high throughput post quantum advanced encrypt standard Galois/Counter mode (AES-GCM) engine for transport layer security (TLS) packet encryption and/or decryption, in accordance with some examples.

FIG. 5 is a flow diagram illustrating operations in a method to implement a high throughput post quantum advanced encrypt standard Galois/Counter mode (AES-GCM) engine for transport layer security (TLS) packet encryption and/or decryption, in accordance with some examples. Referring to FIG. 5, at operation 510 the engine 400 receives TLS packet(s) and signaling in input register 410. At operation 515 the engine 400 performs encryption/decryption operations on data received in the packets, computes the authentication key (h), and computes the authentication tag mask ($E_k(c_1)$). As described above, these operations may be implemented by the AES256 engines in stages 1-14 of the pipeline.

At operation 520 the engine computes a first multiple of the authentication key ($h^2$), a second multiple of authentication key ($h^3$), and a third multiple of authentication key ($h^4$). As described above, these operations may be implemented by the AES256 engines in stages 15-16 of the pipeline. At operation 525 the engine computes a first partial authentication tag. As described above, these operations may be implemented by stage 17 of the pipeline.

At operation 530 the pipeline computes a second partial authentication tag (pat), which is provided as feedback to previous stages of the pipeline, along with the key_id. In addition, the pipeline multiplies the record length by the authentication key (h) and computes the final authentication tag ("pat" also called as "pad"). At operation 535, the encrypted/decrypted data and output signals are pushed to the output register 480 of the pipeline. As described above, these operations may be implemented by stage 18 of the pipeline.

Thus, the pipeline as described herein may implement a 64-byte/clock AES-GCM Encrypt and Decrypt which consumes four 16-byte blocks as input and forms the 64-byte block as: $\{d_1\_in, d_2\_in, d_3\_in, d_4\_in\}$ where $d_1\_in$ is positioned in the most significant position. Within a 16-byte block position of data bytes follow little endian format. The pipeline exhibits substantially zero setup latency. It can be fed data, IV, counter, key, AAD, pat, encrypt, etc. in every clock for the same or different flows identified by key id (kid_in). Further, the pipeline supports variable number of running flows. The key id size is parameterized, for example, by setting KEY_ID_SIZE=8 at compile time it can support a maximum 255 running flows. The kid_in =0 is used for bypass mode.

In some examples the pipeline supports a bypass mode. To bypass data through crypto engine without encoding or decoding. For this set bypass_in =1 and kid_in =0 and setup respective valid_in bits with input data. In some examples the pipeline supports an individual block valid mode to process data in 16-byte granularity. The pipeline receives a 4-bit validin, each bit is associated with respective 16-byte data; i.e., valid_in[3:0] for $\{d_1\_in, d_2\_in, d_3\_in, d_4\_in\}$.

Figure 6:
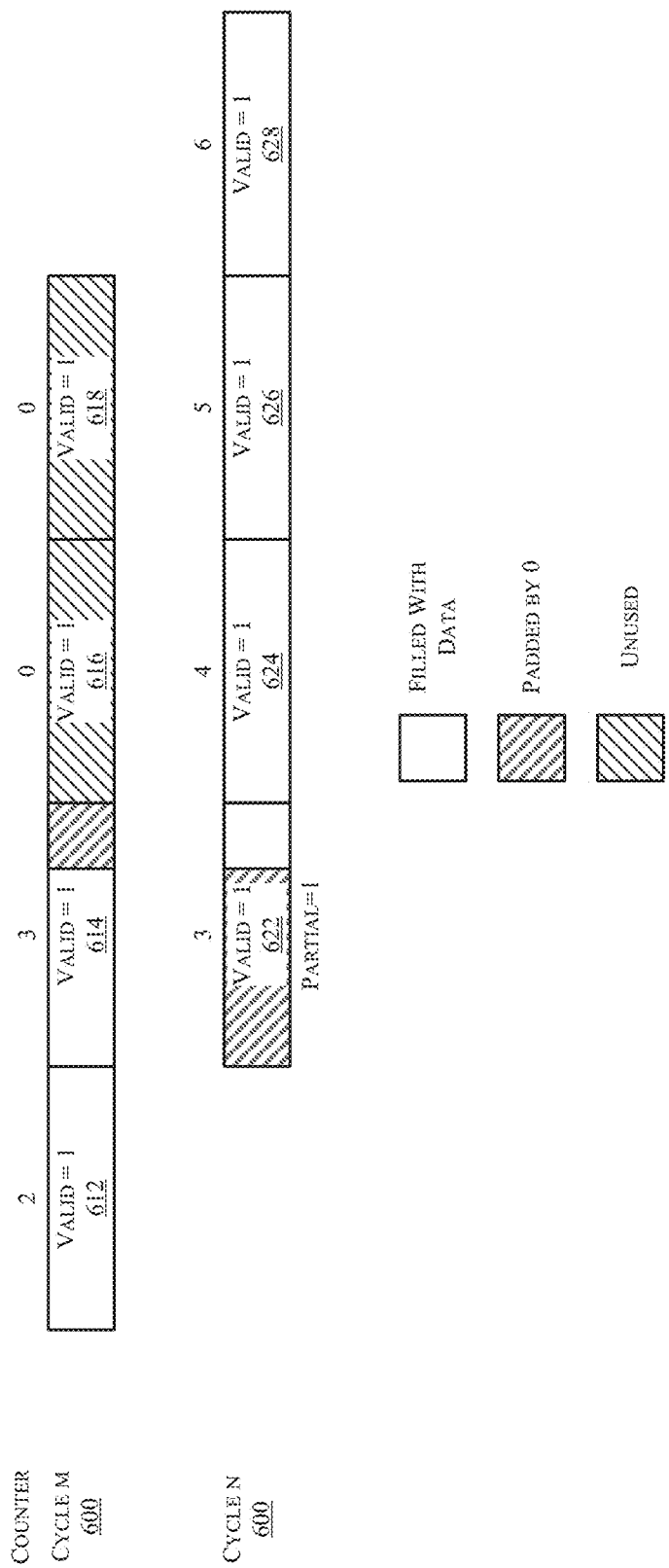
FIG. 6 is a schematic illustration of partial block support in in a method to implement a high throughput post quantum advanced encrypt standard Galois/Counter mode (AES-GCM) engine for transport layer security (TLS) packet encryption and/or decryption, in accordance with some examples.

FIG. 6 is a schematic illustration of partial block support in in a method to implement a high throughput post quantum advanced encrypt standard Galois/Counter mode (AES-GCM) engine for transport layer security (TLS) packet encryption and/or decryption, in accordance with some examples. Referring to FIG. 6, in some examples the pipeline can encrypt packets with any size and without delaying to form a full 16-byte aligned block. Thus, in the example depicted in FIG. 6 cycle M 600 includes four data blocks 612, 614, 616, 618 and cycle N includes four data blocks 622, 624, 626, 628. When a partial block is sent (e.g., at block 614 in cycle-m 600) into the engine 400, unused parts of the partial block 614 will set to zero and it is not required to set this block as partial_block. However, the same block counter value (e.g., block 3) will be sent to the engine in the next cycle (e.g., in cycle-n) to send the later part of the partial block. The cycle-n partial_in input is to set to 1. As illustrated in FIG. 6, in cycle-m the partial block is the block located as the least significant valid block, whereas in cycle-n the rest of the part of the partial block will be placed in the most significant position.

Figure 7:
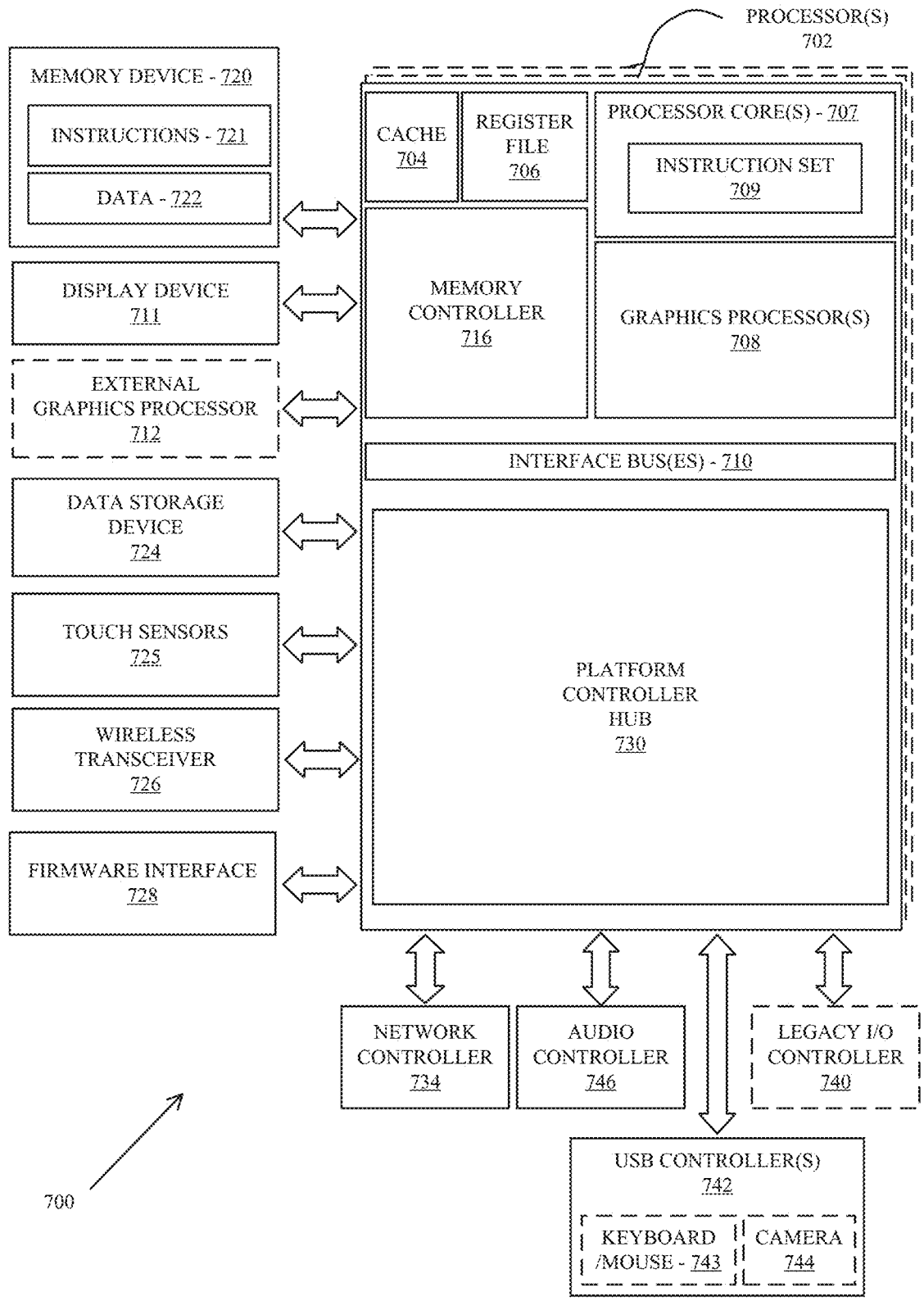
FIG. 7 is a schematic illustration of a computing architecture which may be adapted to implement a high throughput post quantum advanced encrypt standard Galois/Counter mode (AES-GCM) engine for transport layer security (TLS) packet encryption and/or decryption in accordance with some examples.

FIG. 7 illustrates an embodiment of an exemplary computing architecture that may be suitable for implementing various embodiments as previously described. In various embodiments, the computing architecture 700 may comprise or be implemented as part of an electronic device. In some embodiments, the computing architecture 700 may be representative, for example of a computer system that implements one or more components of the operating environments described above. In some embodiments, computing architecture 700 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following pertains to further examples.

Example 1 is an apparatus, comprising an input register to receive at least a portion of a transport layer data packet; an encryption/decryption pipeline communicatively coupled to the input register, comprising a first section comprising a set of advanced encryption standard (AES) engines including at least a first AES engine to perform encryption and/or decryption operations on input data from the at least a portion of a transport layer data packet, a second AES engine to compute an authentication key, and a third AES engine to compute an authentication tag mask; a second section comprising a first set of Galois field multipliers comprising at least a first Galois field multiplier to compute a first multiple of the authentication key, a second multiple of the authentication key, and a third multiple of the authentication key; a third section comprising a second set of Galois field multipliers to compute a first partial authentication tag; and a fourth section comprising a processing circuitry to compute a second partial authentication tag and a final authentication tag.

In Example 2, the subject matter of Example 1 can optionally include an arrangement wherein the transport layer data packet comprises a 64-byte input data block.

In Example 3, the subject matter of any one of Examples 1-2 can optionally include an arrangement wherein the first section comprises a set of four AES-256 engines arranged in parallel to encrypt and/or decrypt the 64-byte input data block; a fifth AES-256 engine to compute an authentication key; and a sixth AES-256 engine to compute an authentication tag mask.

In Example 4, the subject matter of any one of Examples 1-3 can optionally include an arrangement wherein the second section comprises a first Galois field multiplier to compute a multiple of the authentication key; a second Galois field multiplier to compute a third power of the authentication key; and a third Galois field multiplier to compute a fourth power of the authentication key.

In Example 5, the subject matter of any one of Examples 1-4 can optionally include an arrangement wherein the third section comprises a fourth Galois field multiplier to compute a fourth multiple consisting of a first partial authentication tag multiplied by a fourth power of the authentication key; a fifth Galois field multiplier to compute a fifth multiple consisting of a first portion of the input data block multiplied by a third power of the authentication key; a sixth Galois field multiplier to compute a sixth multiple consisting of a second portion of the input data block multiplied by a second power of the authentication key; and a seventh Galois field multiplier to compute a seventh multiple consisting of a third portion of the input data block multiplied by the authentication key.

In Example 6, the subject matter of any one of Examples 1-5 can optionally include an arrangement wherein the first partial authentication tag is initialized to a value of zero.

In Example 7, the subject matter of any one of Examples 1-6 can optionally include an arrangement wherein the wherein the first partial authentication tag is configured to store an intermediate tag value during execution of the pipeline.

In Example 8, the subject matter of any one of Examples 1-7 can optionally include an arrangement wherein the fourth section comprises processing circuitry to provide the second partial authentication tag and a key identifier to one or more of the first section, the second section, and the third section as feedback for a subsequent iteration of the pipeline.

In Example 9, the subject matter of any one of Examples 1-8 can optionally include an arrangement wherein the fourth section comprises an eighth Galois field multiplier to compute an eighth multiple consisting of a length of the transport layer data pack multiplied by the authentication key; and a ninth Galois field multiplier to compute the final authentication tag.

In Example 10, the subject matter of any one of Examples 1-9 can optionally include an output register communicatively coupled to the encryption/decryption pipeline.

Example 11 is an electronic device, comprising a processor and an input/output (I/O) interface to receive data traffic communicated across a network; an input register to receive at least a portion of a transport layer data packet; an encryption/decryption pipeline communicatively coupled to the input register, comprising a first section comprising a set of advanced encryption standard (AES) engines including at least a first AES engine to perform encryption and/or decryption operations on input data from the at least a portion of a transport layer data packet, a second AES engine to compute an authentication key, and a third AES engine to compute an authentication tag mask; a second section comprising a first set of Galois field multipliers comprising at least a first Galois field multiplier to compute a first multiple of the authentication key; a third section comprising a second set of Galois field multipliers to compute a first partial authentication tag; and a fourth section comprising a processing circuitry to compute a second partial authentication tag and a final authentication tag.

In Example 12, the subject matter of Example 1 can optionally include an arrangement wherein the transport layer data packet comprises a 64-byte input data block.

In Example 13, the subject matter of any one of Examples 1-2 can optionally include an arrangement wherein the first section comprises a set of four AES-256 engines arranged in parallel to encrypt and/or decrypt the 64-byte input data block; a fifth AES-256 engine to compute an authentication key; and a sixth AES-256 engine to compute an authentication tag mask.

In Example 14, the subject matter of any one of Examples 1-3 can optionally include an arrangement wherein the second section comprises a first Galois field multiplier to compute a multiple of the authentication key; a second Galois field multiplier to compute a third power of the authentication key; and a third Galois field multiplier to compute a fourth power of the authentication key.

In Example 15, the subject matter of any one of Examples 1-4 can optionally include an arrangement wherein the third section comprises a fourth Galois field multiplier to compute a fourth multiple consisting of a first partial authentication tag multiplied by a fourth power of the authentication key; a fifth Galois field multiplier to compute a fifth multiple consisting of a first portion of the input data block multiplied by a third power of the authentication key; a sixth Galois field multiplier to compute a sixth multiple consisting of a second portion of the input data block multiplied by a second power of the authentication key; and a seventh Galois field multiplier to compute a seventh multiple consisting of a third portion of the input data block multiplied by the authentication key.

In Example 16, the subject matter of any one of Examples 1-5 can optionally include an arrangement wherein the first partial authentication tag is initialized to a value of zero.

In Example 17, the subject matter of any one of Examples 1-6 can optionally include an arrangement wherein the wherein the first partial authentication tag is configured to store an intermediate tag value during execution of the pipeline.

In Example 18, the subject matter of any one of Examples 1-7 can optionally include an arrangement wherein the fourth section comprises processing circuitry to provide the second partial authentication tag and a key identifier to one or more of the first section, the second section, and the third section as feedback for a subsequent iteration of the pipeline.

In Example 19, the subject matter of any one of Examples 1-8 can optionally include an arrangement wherein the fourth section comprises an eighth Galois field multiplier to compute an eighth multiple consisting of a length of the transport layer data pack multiplied by the authentication key; and a ninth Galois field multiplier to compute the final authentication tag.

In Example 20, the subject matter of any one of Examples 1-9 can optionally include an output register communicatively coupled to the encryption/decryption pipeline.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
an input register to receive at least a portion of a transport layer data packet comprising a 64-byte input data block;
a hardware processor defining an encryption/decryption pipeline communicatively coupled to the input register, comprising:
a first section comprising:
a set of four AES-256 engines arranged in parallel to encrypt and/or decrypt the 64-byte input data block;
a fifth AES-256 engine to compute an authentication key; and
a sixth AES-256 engine to compute an authentication tag mask;
a second section comprising:
a first Galois field multiplier to compute a multiple of the authentication key;
a second Galois field multiplier to compute a third power of the authentication key; and
a third Galois field multiplier to compute a fourth power of the authentication key;
a third section comprising:
a fourth Galois field multiplier to compute a fourth multiple consisting of a first partial authentication tag multiplied by a fourth power of the authentication key;
a fifth Galois field multiplier to compute a fifth multiple consisting of a first portion of the input data block multiplied by a third power of the authentication key;
a sixth Galois field multiplier to compute a sixth multiple consisting of a second portion of the input data block multiplied by a second power of the authentication key; and
a seventh Galois field multiplier to compute a seventh multiple consisting of a third portion of the input data block multiplied by the authentication key; and
a fourth section comprising a processing circuitry to compute a second partial authentication tag and a final authentication tag.

2. The apparatus of claim 1, wherein the first partial authentication tag is initialized to a value of zero.

3. The apparatus of claim 2, wherein the first partial authentication tag is configured to store an intermediate tag value during execution of the pipeline.

4. The apparatus of claim 1, wherein the fourth section comprises:
processing circuitry to provide the second partial authentication tag and a key identifier to one or more of the first section, the second section, and the third section as feedback for a subsequent iteration of the pipeline.

5. The apparatus of claim 4, wherein the fourth section comprises:
an eighth Galois field multiplier to compute an eighth multiple consisting of a length of the transport layer data packet multiplied by the authentication key; and
a ninth Galois field multiplier to compute the final authentication tag.

6. The apparatus of claim 1, further comprising:
an output register communicatively coupled to the encryption/decryption pipeline.

7. An electronic device, comprising:
a processor; and
an input/output (I/O) interface to receive data traffic communicated across a network;
an input register to receive at least a portion of a transport layer data packet;
an encryption/decryption pipeline communicatively coupled to the input register, comprising:
a first section comprising a set of advanced encryption standard (AES) engines including at least a first AES engine to perform encryption and/or decryption operations on input data from the at least a portion of a transport layer data packet, a second AES engine to compute an authentication key, and a third AES engine to compute an authentication tag mask;
a first section comprising:
a set of four AES-256 engines arranged in parallel to encrypt and/or decrypt the 64-byte input data block;
a fifth AES-256 engine to compute an authentication key; and
a sixth AES-256 engine to compute an authentication tag mask;
a second section comprising a first set of Galois field multipliers comprising at least a first Galois field multiplier to compute a first multiple of the authentication key, a second multiple of the authentication key, and a third multiple of the authentication key;
a second section comprising:
a first Galois field multiplier to compute a multiple of the authentication key;
a second Galois field multiplier to compute a third power of the authentication key; and
a third Galois field multiplier to compute a fourth power of the authentication key;
a third section comprising a second set of Galois field multipliers to compute a first partial authentication tag; and
a third section comprising:
a fourth Galois field multiplier to compute a fourth multiple consisting of a first partial authentication tag multiplied by a fourth power of the authentication key;
a fifth Galois field multiplier to compute a fifth multiple consisting of a first portion of the input data block multiplied by a third power of the authentication key;
a sixth Galois field multiplier to compute a sixth multiple consisting of a second portion of the input data block multiplied by a second power of the authentication key; and
a seventh Galois field multiplier to compute a seventh multiple consisting of a third portion of the input data block multiplied by the authentication key; and
a fourth section comprising a processing circuitry to compute a second partial authentication tag and a final authentication tag.

8. The electronic device of claim 7, wherein the first partial authentication tag is initialized to a value of zero.

9. The electronic device of claim 8, wherein the first partial authentication tag is configured to store an intermediate tag value during execution of the pipeline.

10. The electronic device of claim 7, wherein the fourth section comprises:

processing circuitry to provide the second partial authentication tag and a key identifier to one or more of the first section, the second section, and the third section as feedback for a subsequent iteration of the pipeline.

11. The electronic device of claim 10, wherein the fourth section comprises:

an eighth Galois field multiplier to compute an eighth multiple consisting of a length of the transport layer data packet multiplied by the authentication key; and a ninth Galois field multiplier to compute the final authentication tag.

12. The electronic device of claim 7, further comprising:

an output register communicatively coupled to the encryption/decryption pipeline.

* * * * *